Oct. 15, 1968   J. DRABIK ETAL   3,405,927
SPRING ADJUSTING DEVICE FOR USE IN A PRESSURE REGULATOR
Filed June 3, 1965

INVENTORS
JOSEF DRABIK AND
MANFRED KLARE

Darbo, Robertson &
Vandenburgh
ATT'YS

United States Patent Office 3,405,927
Patented Oct. 15, 1968

3,405,927
SPRING ADJUSTING DEVICE FOR USE IN
A PRESSURE REGULATOR
Josef Drabik, Osnabruck, and Manfred Klare, Georgsmarienhutte, Germany, assignors to G. Kromschroder A.G., Osnabruck, Germany, a corporate body of Germany
Filed June 3, 1965, Ser. No. 461,066
Claims priority, application Germany, June 6, 1964, K 48,132; Feb. 12, 1965, K 50,339
1 Claim. (Cl. 267—1)

ABSTRACT OF THE DISCLOSURE

An actuating device is provided for a pressure regulator of the type which has a spring-loaded diaphragm. In contact with the end of the spring opposite that bearing on the diaphragm is a flange which can be moved into one of a limited number of predetermined fixed positions. These fixed positions correspond to desired pressure settings for the regulator valve. In the preferred form the flange is on both of a pair of coaxially-positioned tubular elements, movable axially with respect to each other. The tubular elements may be slidably telescopically one within the other.

---

This invention relates to a pressure regulator and more particularly to a pressure regulator of a type having a modulating valve controlled by a diaphragm responsive to fluid pressure, wherein comparatively simple and inexpensive means are provided for readily obtaining a counter force acting on the diaphragm which is matched to requirements, to effect regulation of the pressure at the desired value.

Pressure regulators are known wherein a counter force is obtained by means of a coiled compression spring acting between the upper face of a generally horizontal diaphragm and a stop defined by the lower face of an upper end wall of a housing member of inverted cup-shaped configuration. Such pressure regulators have been generally satisfactory in operation but have had disadvantages, particularly in that they have not been readily changed to accommodate different pressure and fluid requirements.

The present invention was evolved with the general object of overcoming the disadvantages of prior constructions, and more particularly in permitting adjustment of the regulator while obtaining efficient and accurate operation, and without increasing the cost of manufacture.

According to this invention, load means are provided having surfaces for respectively engaging compression spring means in a fixed stop in facing relation to one side of a diaphragm, with the load means being adjustable to obtain different spacings between the surfaces and to thereby obtain selective limits on the pressure required to engage the load means with the stop.

An important feature of the invention is in the provision of load means in the form of a tubular spacer member in coaxial relation to a coiled compression spring and having a flange portion engaging one end of the spring. In one form of the invention, the flange portion extends radially outwardly with the spring being disposed outside the tubular member. In another form of pressure regulator according to the invention, the flange portion extends radially inwardly with the spring being disposed within the tubular member.

In accordance with the specific feature of the invention, the flange portion of the spacer member is at one end thereof and the spacer member is reversible to obtain different spacings between the flange portion and the fixed stop.

Further important features of the invention relates to the provision of telescopingly adjustable means between the fixed stop and the diaphragm for obtaining selective limits on the permissible movement of the diaphragm toward the fixed stop. A specific feature is in the provision of adjustment means on one of two telescoping members arranged for selective engagement with stop surfaces to adjust the total length of the telescoping members.

According to a further specific feature of the invention, a pair of tubular members are provided each having a flange portion at one end thereof, the members being selectively positionable either with one inside the other or with the two members in end-to-end relation, so as to readily obtain a selective adjustment on length.

With these features, a pressure regulator is provided which is inexpensive in construction, while being readily adjustable to obtain the desired operation, and while being durable and reliable.

This invention contemplates other objects, features and advantages which will become more fully apparent from the following detailed description taken in conjunction with the accompanying drawings which illustrate preferred embodiments and in which.

Figure 1:
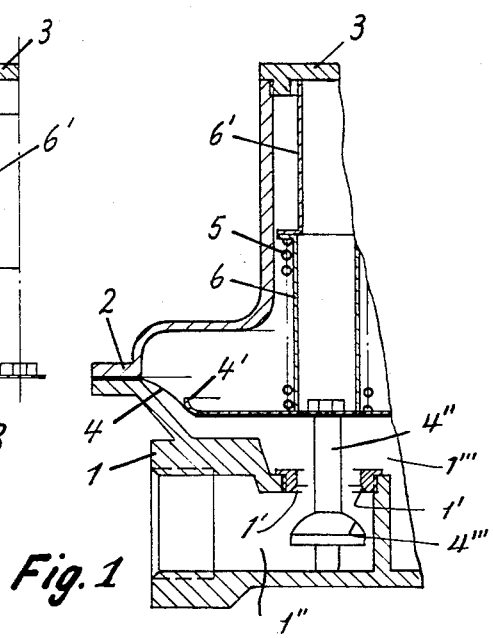
FIGURE 1 is a cross-sectional view through a portion of a regulator constructed according to the invention.

Referring first to FIGURE 1, reference numerals 1 and 2 respectively designate lower and upper parts of a regulator casing or housing, with a top plate 3 being releasably secured to the upper end of a cylindrical wall of the upper part 2. The peripheral edge of a diaphragm 4 is held between the lower and upper parts 1 and 2, with a reinforcing plate 4' being provided on the diaphragm 4. The center of the diaphragm reinforcing plate 4' is rigidly connected to the upper end of a valve stem 4", the lower end of which is secured to a valve member 4'''. The valve member 4''' is movable upwardly toward a downwardly facing valve seat 1', between an inlet portion 1" and an outlet portion 1''' of a passage defined by the lower housing part 1.

In the general operation of the regulator, an increase in pressure in the outlet portion 1''' of the passage tends to move the diaphragm 4 upwardly to move the valve member 4''' upwardly toward the valve seat 1', to thereby reduce pressure. Conversely, when the pressure in the outlet portion 1''' decreases, the diaphragm 4 moves downwardly to move the valve member 4''' downwardly away from the valve seat 1', to thereby increase pressure in the outlet portion 1''' of the passage. Accordingly, a substantially constant pressure can be maintained.

Figure 2:
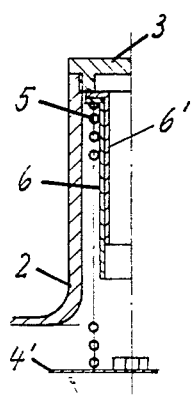
FIGURE 2 is a partial view similar to FIGURE 1 but showing the tubular elements in an alternative position.

Referring now to FIGURE 2, a coiled compression spring 5 is provided having a lower end engaged with the reinforcing plate 4' and having an upper end engaged with an outwardly extending flange portion of a tubular member 6 in coaxial relation within the cylindrical portion of the upper housing part 2. As shown in FIGURE 2, the flange portion of the tubular member 6 is at the upper end thereof and is immovable upwardly by the presence of an abutment defined by the lower face of the top plate 3. The flange portion of an inner tubular member 6' is engaged between the flange portion of the tubular member 6 and the lower face of the top plate 3. With this arrangement, the spring 5 is extended and exerts a relatively light force on the diaphragm, such that the pressure is maintained constant at a relatively low value. By way of example, and not by way of limitation, the pressure may be maintained constant at a value of 60 mm. of water, as frequently desired for city gas.

Figure 3:
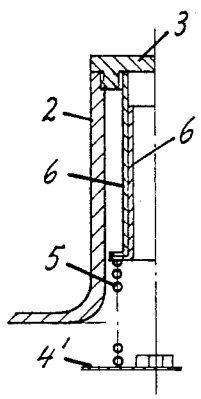
FIGURE 3 is another partial view similar to FIGURE 1 and again showing the tubular elements in an alternative position.

FIGURE 3 shows the same parts as in FIGURE 1, but the tubular members 6 and 6' are reversed, the flange portions thereof being at the bottom end thereof and being engaged with the spring 5. The spring 5 is thus compressed to a substantial extent, and exerts a greater force on the diaphragm, so that the regulated pressure value is increased. By way of example, the pressure value may be on the order of 150 mm. of water, as frequently desired for natural gas. Accordingly, by merely reversing the position of the tubular member 6, the pressure value at which the regulator operates is readily adjusted.

As shown in FIGURE 1, the position of the tubular member 6' is reversed from the position shown in FIGURE 2, the flange portion thereof being engaged with the flange portion of the member 6 at the upper end thereof, and the inner end of the top plate 3. With this arrangement, the upward movement of the diaphragm reinforcing plate 4' is limited. This arrangement may be used for preventing operation of the valve and to permit the relatively unimpeded passage of a liquid, for example.

This invention thus provides relatively simple spacing and loading means for a pressure regulator, permitting the desired regulated pressure value to be readily obtained. A shift from one regulated pressure value to another can be easily obtained by merely removing the top plate 3, shifting the position of parts, and replacing the top plate 3.

It will be understood that modifications and variations may be effected without departing from the spirit and scope of the novel concepts of this invention.

We claim:
1. A spring adjusting device for a pressure regulator for presetting the loading pressure of a spring at one of a limited number of fixed predetermined pressures, said adjusting device including: a compression spring having one end positioned adjacent an inside end wall of a housing member, a pair of tubular members of differing predetermined lengths each having a flange portion at one of their ends and capable of being telescopically arranged, both said flange portions positioned between said one end of said spring and the end wall of the housing, and said spring end being spaced from the end wall and therefore its preset loading pressure predetermined by alternative arrangements of the members such as the thickness of both flange portions, the thickness of the flange portions plus the length of the longer of the tubular members, or the thickness of the flange portions plus the length of the shorter of the tubular members.

References Cited
UNITED STATES PATENTS

| | | | |
|---|---|---|---|
| 1,658,951 | 2/1928 | Stitt | 137—505.41 |
| 1,712,697 | 5/1929 | Frankenberg | 137—505.42 |
| 2,304,404 | 12/1942 | Flanagan | 251—63 X |
| 2,342,001 | 2/1944 | Magnuson | 92—133 |
| 3,032,054 | 5/1962 | Irwin | 137—505.46 X |
| 3,111,962 | 11/1963 | Cox | 137—505.41 X |
| 2,891,784 | 6/1959 | Taylor | 137—116.5 XR |

FOREIGN PATENTS

| | | |
|---|---|---|
| 1,060,713 | 11/1953 | France. |
| 911,567 | 5/1954 | Germany. |
| 161,145 | 6/1933 | Switzerland. |

WILLIAM F. O'DEA, *Primary Examiner.*

H. WEAKLEY, *Assistant Examiner.*